United States Patent [19]
Kim et al.

[11] Patent Number: 5,500,844
[45] Date of Patent: Mar. 19, 1996

[54] DEVICE FOR DRIVING MINIDISK PLAYER

[75] Inventors: Kwang Kim; Heui Sik Seo, both of Seoul, Rep. of Korea

[73] Assignee: Goldstar Co., Ltd., Seoul, Rep. of Korea

[21] Appl. No.: 253,743

[22] Filed: Jun. 3, 1994

[30] Foreign Application Priority Data

Jun. 4, 1993 [KR] Rep. of Korea .................. 10081/1993

[51] Int. Cl.⁶ .............................. G11B 17/04; G11B 3/36
[52] U.S. Cl. ......................................... 369/77.2; 369/77.1
[58] Field of Search .................... 369/33, 36, 37, 369/38, 75.1, 75.2, 77.1, 77.2, 219; 360/98.04, 98.05, 98.06, 99.06, 99.07

[56] References Cited

U.S. PATENT DOCUMENTS

| | | | |
|---|---|---|---|
| 4,602,361 | 7/1986 | Kumaki et al. | 369/77.2 |
| 4,701,900 | 10/1987 | Hasegawa et al. | 369/36 |
| 4,701,901 | 10/1987 | Imai | 369/77.1 |
| 4,723,185 | 2/1988 | Maeda | 369/77.2 |
| 5,119,357 | 6/1992 | Tsuruta et al. | 369/77.1 |
| 5,313,351 | 5/1994 | Lee | 369/77.2 |

FOREIGN PATENT DOCUMENTS 62-183081   8/1987   Japan .
1-98160    4/1989   Japan .

Primary Examiner—Stuart S. Levy
Assistant Examiner—David L. Ometz
Attorney, Agent, or Firm—Finnegan, Henderson, Farabow, Garrett & Dunner

[57] ABSTRACT

A simple device for driving a minidisk player. This device carries out, using a common drive motor, both the disk loading/unloading operation and the pickup driving operation of the portable minidisk player. A power transmission gear is rotated by the rotational force of the common drive motor. The power transmission gear engages an idle gear which is moved by the turning motion of a link. This idle gear selectively engages either a disk loading gear or a pick up drive gear, thus to carry out the disk loading/unloading operation and the pickup driving operation. First and second locking units lock the idle gear to one of two predetermined positions so as to let the idle gear be rotated in opposed directions while engaging either the disk loading gear or the pickup drive gear. Each locking unit has a spring-biased turning member having a push projection. This push projection pushes a locking projection of the link to a stopper, thus to lock the link at a position, at which position the idle gear engages either the disk loading gear or the pickup drive gear.

10 Claims, 7 Drawing Sheets

FIG.2a
PRIOR ART
FIG.2b
PRIOR ART
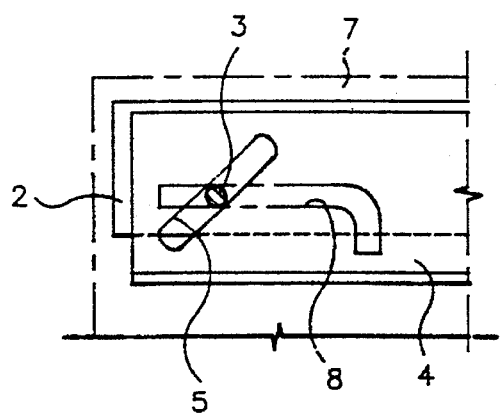
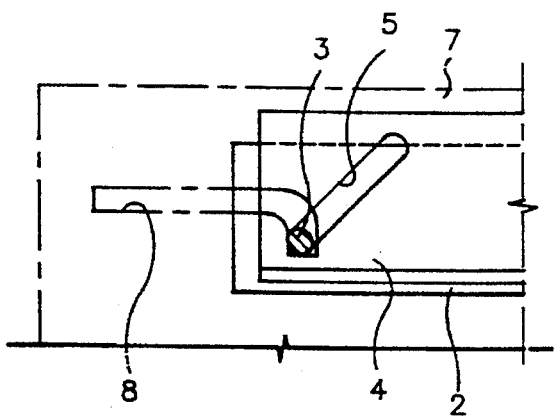
FIG.3
PRIOR ART
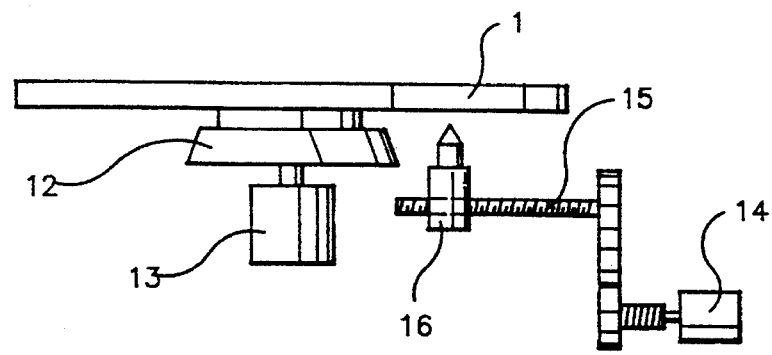

DEVICE FOR DRIVING MINIDISK PLAYER

BACKGROUND OF THE INVENTION

1. Field of the Invention

The present invention relates in general to a drive device for a portable minidisk player and, more particularly, to an improved structure in such a drive device for simplifying construction, reducing cost, and increasing compactness.

2. Description of the Related Art

Typical portable minidisk players generally use microcompact disks. Conventionally, such portable minidisk players play the microcompact disks in the order they are loaded by rotating the loaded disk and picking up information from the rotating disk by a pickup. To facilitate carrying the minidisk players, these players should be light, thin, small, simple, and compact.

With reference to FIGS. 1, 2a and 2b, there is shown a disk loading part of a typical drive device for a portable minidisk player. In these figures, the front loading operation or the disk loading operation of the typical device is represented.

In FIG. 1, the cartridge guide bracket for receiving a minidisk 1 is designated by the numeral 2. The guide bracket 2 is provided with a pair of projections 3 on each side. The pair of projections 3, spaced out at an interval, penetrate slant slits 5 of a power transmission rack 4 and in turn are inserted into slits 8 of a guide panel 7. The two guide panels 7 are fixedly mounted on opposed sides of a deck 6. One guide panel 7 is shown in FIG. 1. The power transmission rack 4 engages and cooperates with a gear train 9. The drive spur gear of the gear train 9 engages a worm gear 11 mounted on the output shaft of a loading motor 10.

When the cartridge guide bracket 2 is placed at the front disk inlet of the deck 6 and receives a new disk 1 therein as shown in FIG. 2a, the insertion of disk 1 is sensed by a limit switch (not shown). The limit switch, when sensing the disk insertion, outputs a disk sensing signal to start the loading motor 10. The rotational force of the loading motor 10 is transmitted to the power transmission rack 4 through the worm gear 11 and the gear train 9. The power transmission rack 4 linearly moves rightward in FIG. 2a, thereby starting the disk loading operation.

When the power transmission rack 4 starts its rightward linear movement as shown in FIG. 2a, the projections 3 of the guide bracket 2 gradually linearly move in the horizontal sections of slits 8 of the guide panel 7. When the center of the disk 1 precisely coincides with the center of a turntable 12, the projections 3 of the guide bracket 2 reach the vertical sections of slits 8 of the panel 7 and, at the same time, descend along those vertical sections until seated on the bottoms of the vertical sections. As briefly described, the cartridge guide bracket 2, having the disk 1, moves back and down in the minidisk player under the guide of both slant slits 5 of the power transmission racks 4 and the slits 8 of the guide panels 7. The slits 5 and 8 cooperate with each other, and finish the disk loading operation.

When unloading the disk 1, the loading motor 10 rotates in the opposite direction, and the power transmission racks 4 move leftward in FIG. 2b. The leftward linear movement of the power transmission racks 4 causes the projections 3 of the guide bracket 2 to be pushed up by the slant slits 5 of the racks 4 and in turn to ascend along the vertical sections of the slits 8 of the guide panels 7. The projections 3 of the guide bracket 2, thereafter, move in the horizontal sections of the slits 8 of the guide panels 7, thus the cartridge guide bracket 2 reaches the front disk inlet of the player as shown in FIG. 2a. The disk unloading operation is thus finished.

FIG. 3 is a sectional view of a pickup drive part of the typical minidisk player drive device. As shown in this drawing, the disk 1 is precisely seated on the turntable 12 as a result of the above disk loading operation. Turntable 12 is rotated by a spindle motor 13. When the disk 1 is precisely seated on the motor-driven turntable 12, a pickup 16 starts the operation of picking up the information of the disk 1. This pickup 16 is driven by a lead screw 15. The lead screw 15 is rotated by the rotational force of a pickup drive motor 14 that is placed at a side of the spindle motor 13. To transmit the rotational force of the pickup drive motor 14 to the lead screw 15, a plurality of gears are arranged between and engaged with the output shaft of the motor 14 and the lead screw 15. In this case, the pickup 16 in its initial position should be placed above the center of the disk 1.

However, it has been noted that the typical device for driving the portable minidisk player has the following problems.

The typical minidisk player drive device should have at least two motors, that is, the loading motor 10 and the pickup drive motor 14, for carrying out the disk loading/unloading operation and driving the pickup 16 respectively. With the two motors, the cost of the minidisk player is increased. The expensive cost deteriorates the competitive power of the products.

The above drive device uses the gear train 9 for linear reciprocation of the power transmission rack 4, so that the loading motor 10 should use a large capacity and large-sized motor. The gear train 9 also occupies considerable space in the drive device and, as a result, enlarges the size of the player. This directly runs counter to the recent trend of compactness of the portable minidisk players.

SUMMARY OF THE INVENTION

It is, therefore, an object of the present invention to provide a device for driving a minidisk player in which the aforementioned problems can be overcome and which carries out, using one drive motor, both the disk loading/unloading operation and the pickup driving operation of the portable minidisk player.

In order to accomplish the above object, a device for driving a minidisk player in accordance with an embodiment of the present invention comprises: a drive motor mounted on a deck; a power transmission gear rotated by rotational force of the motor; friction means coming into surface contact with the power transmission gear; a link coming into surface contact with the friction means, the link being turned clockwise or counterclockwise depending on rotating direction of the power transmission gear; an idle gear rotatably mounted on the link and rotated by rotational force of the power transmission gear; a disk loading gear placed in turning range of the link, the loading gear gearing into the idle gear during a disk loading/unloading operation, thus to make a cartridge guide bracket reciprocating; a pickup drive gear placed in the turning range of the link, the pickup drive gear gearing into the idle gear during a pickup driving operation, thus to drive a pickup; and first and second locking units for locking the idle gear to one of predetermined two positions so as to let the idle gear be rotated in opposed directions while gearing into either the disk loading gear or the pickup drive gear.

BRIEF DESCRIPTION OF THE DRAWINGS

The above and other objects, features and advantages of the present invention will be more clearly understood from the following detailed description taken in conjunction with the accompanying drawings, in which:

FIGS. 2a and 2b are side views showing a disk loading operation of the typical drive device of FIG. 1 respectively, in which:

FIG. 2a shows a cartridge guide bracket of the device in the disk unloading position; and FIG. 2b shows the cartridge guide bracket of the device in the disk loading position;

FIG. 3 is a sectional view of a pickup drive part of the typical minidisk player drive device;

FIGS. 4a and 4b are plan views showing construction and operation of a minidisk player drive device in accordance with a preferred embodiment of the present invention, in which:

FIG. 4a shows the device in the disk loading/unloading operation; and

FIG. 4b shows the device in the pickup driving operation;

DESCRIPTION OF THE PREFERRED EMBODIMENTS

Figure 1:
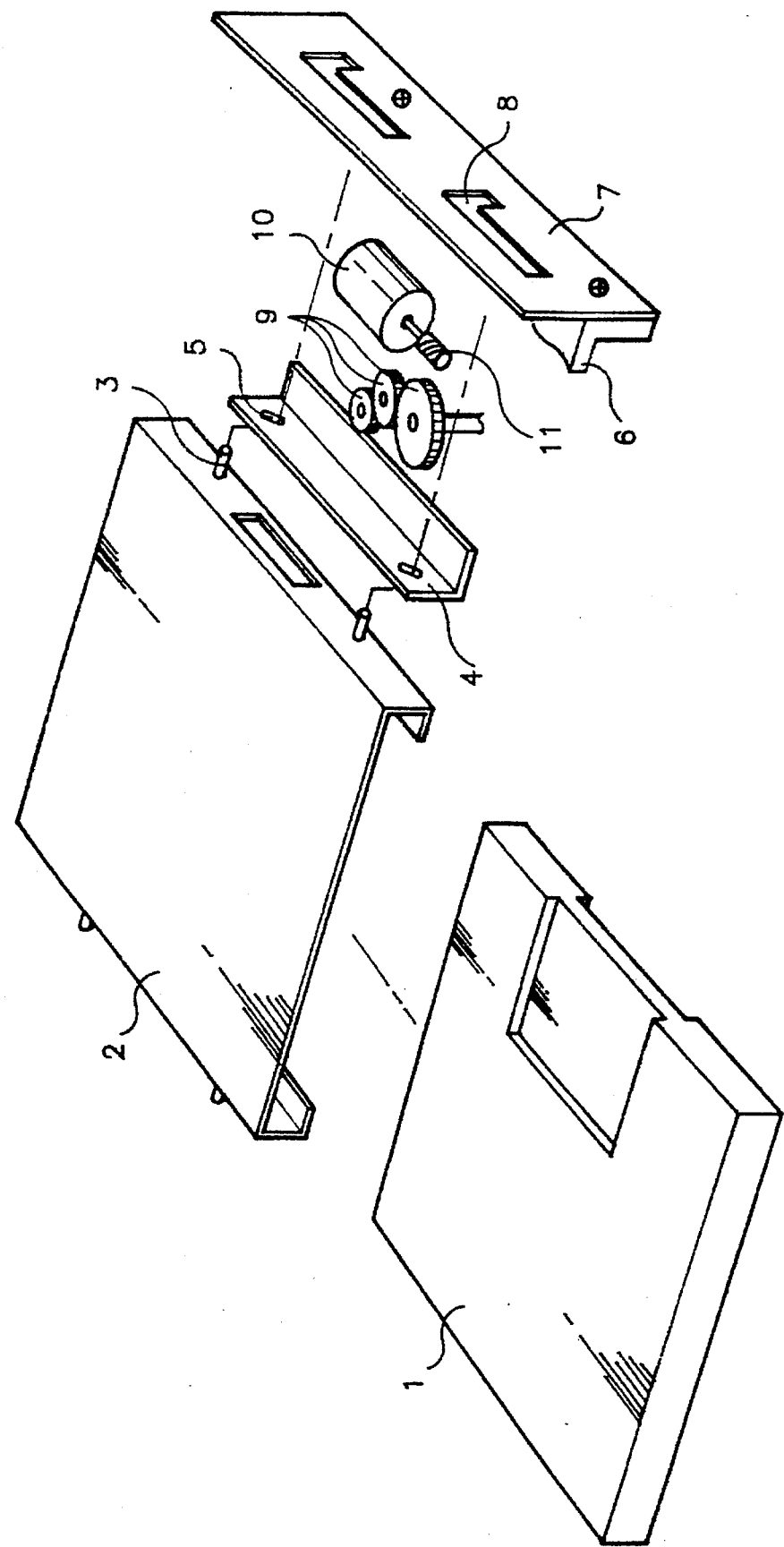
FIG. 1 is an exploded perspective view of a disk loading part of a typical minidisk player drive device.

In the following description of an embodiment of this invention, those elements common to both the embodiment of this invention and the prior art embodiment of FIG. 1 will carry the same reference numerals.

Figure 4A:
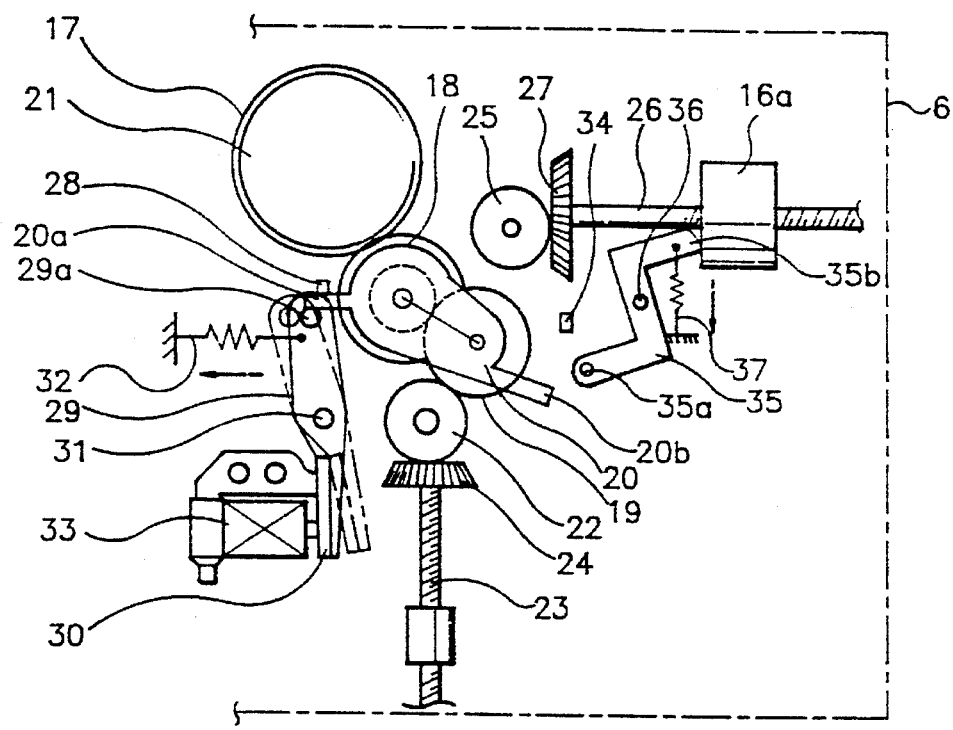
Figure 4B:
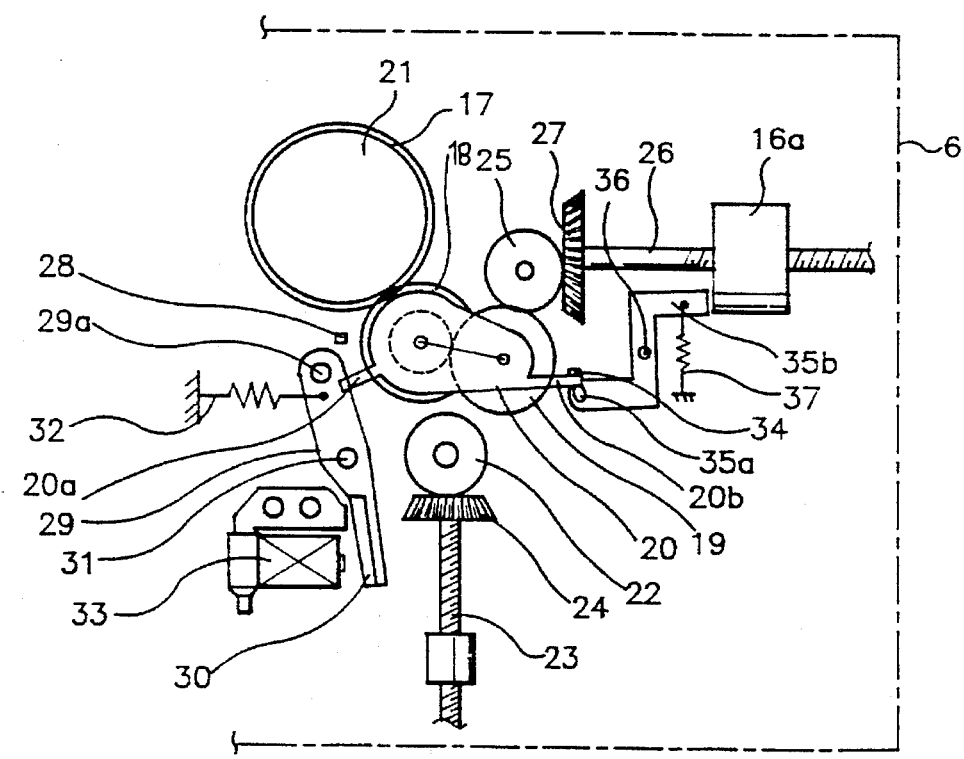
Figure 5A:
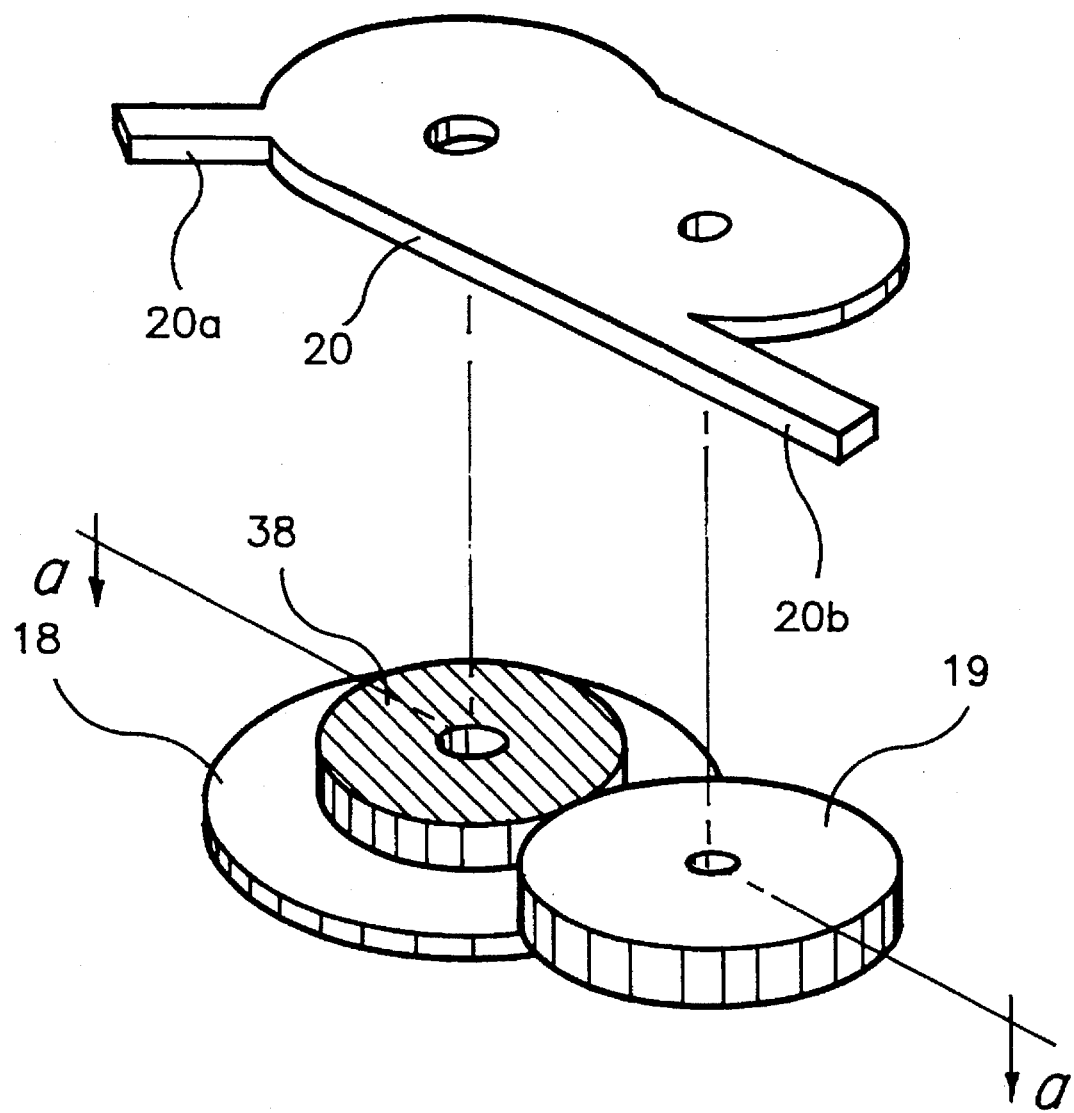
FIG. 5a is a perspective view showing the relative position between a power transmission gear and a link of the drive device.
Figure 5B:
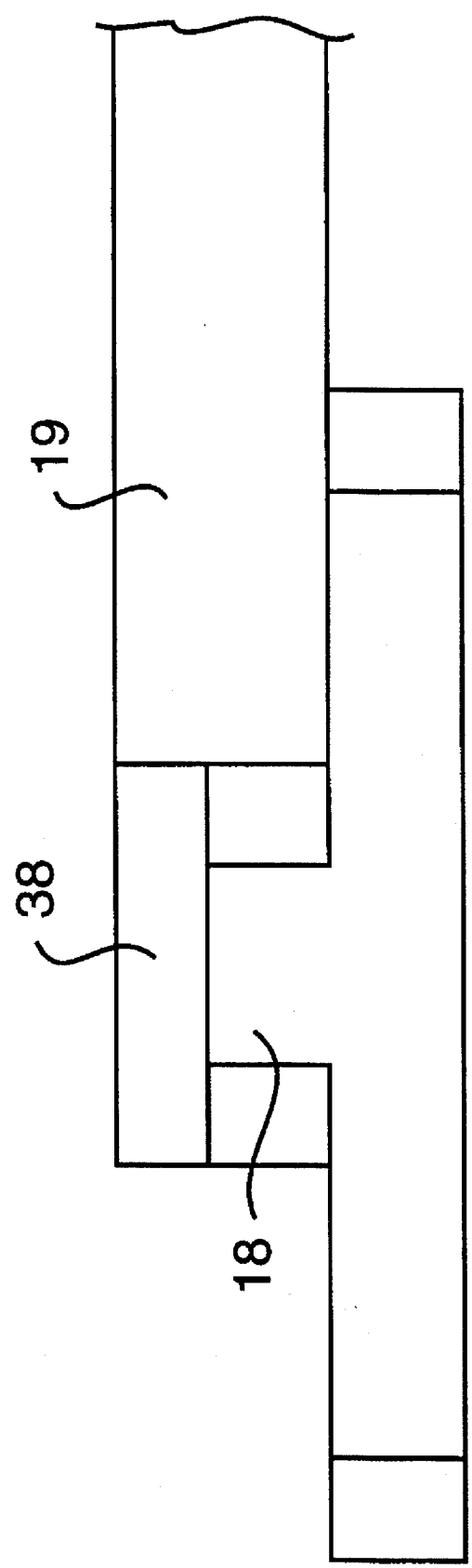
FIG. 5b is a cut-away sectional view of FIG. 5a along line a—a.
Figure 6:
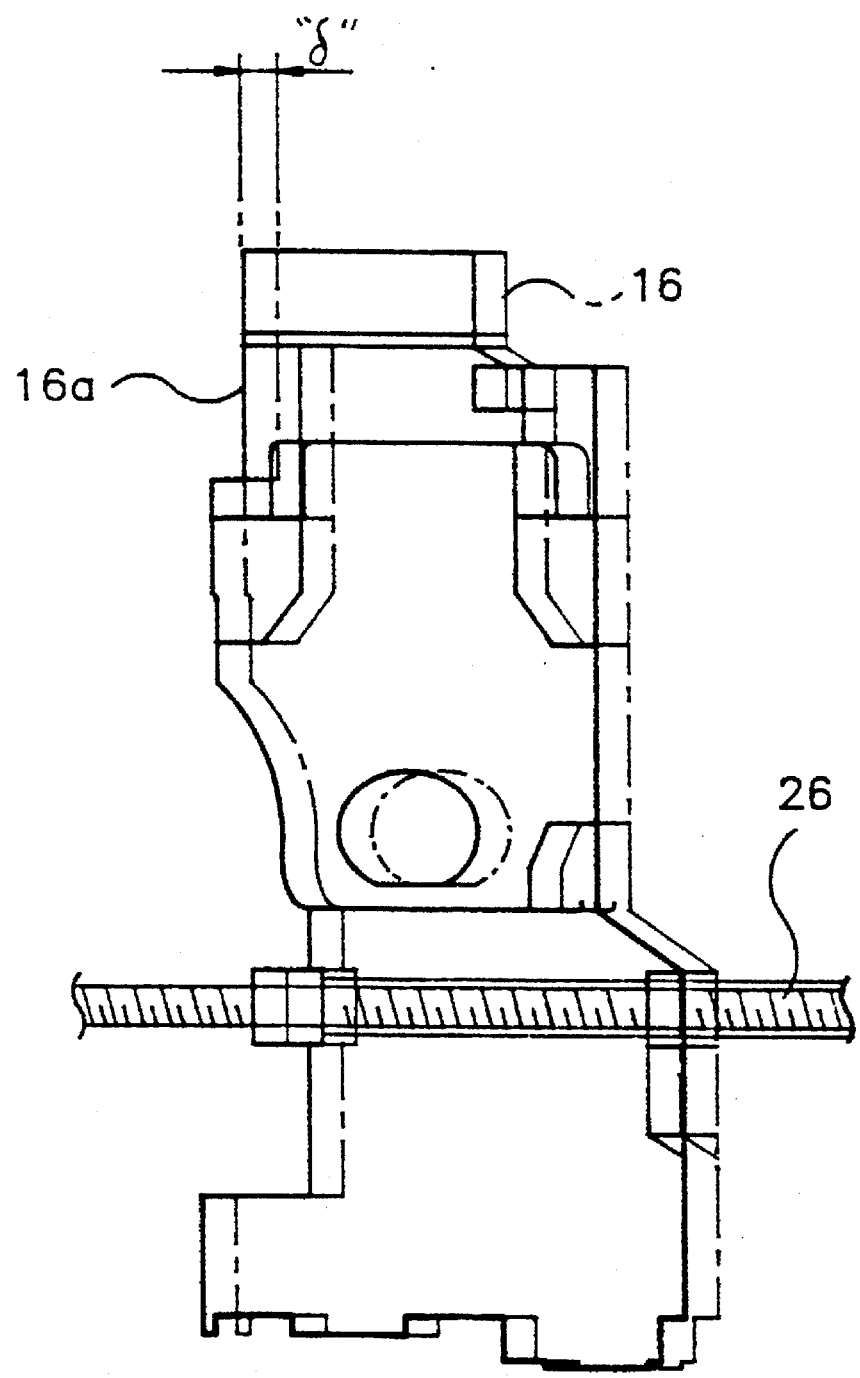
FIG. 6 is a plan view showing an initial position of a pickup of the drive device of the present invention.
Figure 7A:
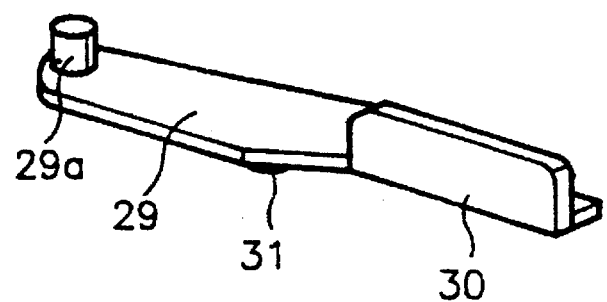
FIGS. 7a and 7b are perspective views of first and second turning members of the drive device of this invention respectively.
Figure 7B:
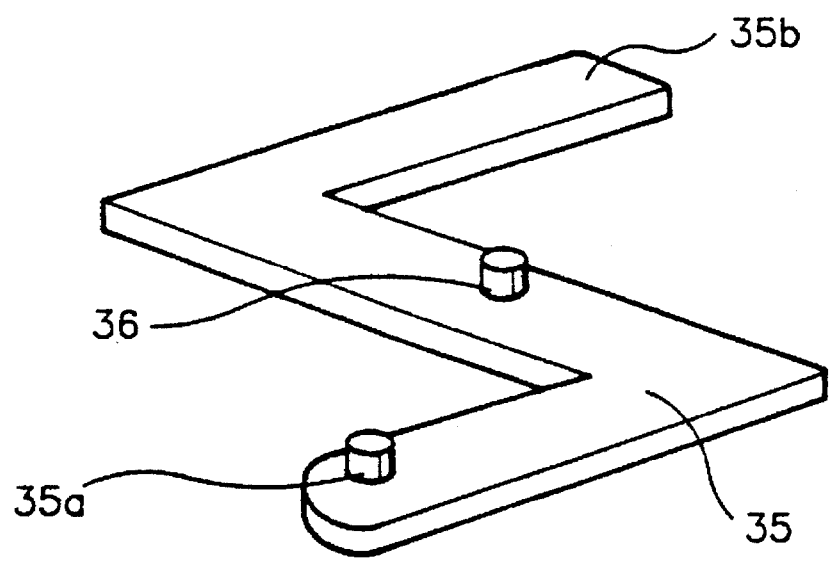

FIGS. 4a and 4b are plan views showing the construction and operation of a disk player drive device in accordance with a preferred embodiment of the present invention. FIG. 5a is a perspective view showing the relative position between a power transmission gear and a link of the drive device. FIG. 6 is a plan view showing an initial state of a pickup of the drive device of the present invention. FIGS. 7a and 7b are perspective views of first and second turning members of the drive device of the present invention respectively.

As shown in FIGS. 4a and 4b, the disk player drive device of the present invention comprises a drive motor 17 fixedly mounted on a deck 6. This motor 17 is connected to a power transmission gear 18 and transmits its rotational force to the gear 18, thus to rotate the gear 18. Friction means comes into surface contact with the top surface of the power transmission gear 18. The above friction means also comes into surface contact with the bottom surface of a link 20. This link 20 is turned clockwise or counterclockwise depending on the rotating direction of the power transmission gear 18. An idle gear 19 is rotatably mounted on the link 20 and is rotated by the rotational force of the power transmission gear 18. The drive device also includes a loading gear 22 which is rotatably mounted on the deck 6 in the turning range of the link 20. The loading gear 22 selectively gears into the idle gear 19 during the disk loading/unloading operation, thus to make the cartridge guide bracket reciprocating. A pickup drive gear 25 is rotatably mounted on the deck 6 in the turning range of the link 20. The pickup drive gear 25 selectively engages the idle gear 19 during the pickup driving operation, thus to drive the pickup 16a. So that the idle gear 19 rotates in opposed directions while smoothly engaging either the loading gear 22 or the pickup drive gear 25, the drive device further includes a pair of locking units. The pair of locking units lock the idle gear 19 into one of two predetermined positions. At each of the two positions, the idle gear 19 engages either the loading gear 22 or the pickup drive gear 25.

In the above player drive device, the power transmission gear 18 may be indirectly applied with the rotational force of the motor 17 through a drive gear 21, which gear 21 is fixed to the output shaft of the motor 17, as shown in FIGS. 4a and 4b. Alternatively, the power transmission gear 18 may be directly applied with the rotational force of the motor 17. In this case, the power transmission gear 18 may be directly fixed to the output shaft of the motor 17.

As shown in FIG. 5a, the friction means coming into surface contact with both the power transmission gear 18 and the link 20 is a wool disc 38 interposed between the gear 18 and the link 20. This wool disc 38 used as the friction means is fixedly mounted on either the gear 18 or the link 20 and rotates the link 20 in the rotating direction of the power transmission gear 18.

The loading gear 22 for reciprocating the cartridge guide bracket engages either its driven gear or a first driven gear 24 which is in turn coupled to a first lead screw 23. In the same manner, the pickup drive gear 25 for driving the pickup 16a engages either its driven gear or a second driven gear 27 which is in turn coupled to a second lead screw 26.

The first locking unit comprises a solenoid 33 mounted on the deck 6. A first locking projection 20a is integrally formed on a side of the link 20, such that it is turned in opposed directions depending on the opposed directional turning motion of the link 20. The first locking unit also includes a first stopper 28 fixedly mounted on the deck 6. This first stopper 28 will be engaged with the first locking projection 20a of the link 20 when the idle gear 19 engages the loading gear 22 for carrying out the disk loading/unloading operation. A locking sensor (not shown) is provided to sense the engagement of the first locking projection 20a with the first stopper 28. The first locking unit further includes a first turning member 29 rotatably mounted on the deck 6. This first turning member 29 is turned clockwise about its hinged shaft 31 by the magnetic force of the solenoid 33 so as to be closer to the first stopper 28 when the locking sensor senses the engagement of the first locking projection 20a with the first stopper 28. A first push projection 29a is integrally formed on an end of the first turning member 29. When the idle gear 19 engages the loading gear 22 so as to carry out the loading operation as shown in FIG. 4a, the first locking projection 20a of the link 20 will be tightly sandwiched between the first stopper 28 and the first push projection 29a of the turning member 29, thus to reliably retain the idle gear 19 engaging the loading gear 22.

In order to prevent a possible interference between the first turning member 29 and the first locking projection 20a during the turning motion of the link 20 for the engagement of the first locking projection 20a with the first stopper 28, the first turning member 29 is biased by first spring means or a first tension coil spring 32. When carrying out the disk loading/unloading operation, the above first turning member 29 should be turned clockwise about its hinged shaft 31 while overcoming the spring force of the coil spring 32 or tensioning this spring 32. This object is achieved by a metal piece 30 which is mounted on the other end of the first turning member 29 and attracted by the magnetic force of the solenoid 33. The structure of the first turning member 29 is shown in detail in FIG. 7a.

The second locking unit comprises a second locking projection 20b. This second projection 20b is integrally formed on the other side of the link 20, such that it is turned in opposed directions depending on the opposed directional turning motion of the link 20. The second locking unit also includes a second stopper 34 fixedly mounted on the deck 6. This second stopper 34 will be engaged with the second locking projection 20b of the link 20 when the idle gear 19 engages the pickup drive gear 25 for carrying out the pickup driving operation. The second locking unit further includes a second turning member 35. This second turning member 35 is turned clockwise about its hinged shaft 36 by the spring force of second spring means or of a second tension coil spring 37 so as to be closer to the second stopper 34 when the second locking projection 20b is engaged with the second stopper 34.

A second push projection 35a is integrally formed on an end of the second turning member 35. When the idle gear 19 engages the pickup drive gear 25 so as to carry out the pickup driving operation as shown in FIG. 4b, the second locking projection 20b of the link 20 will be tightly sandwiched between the second stopper 34 and the second push projection 35a of the second turning member 35, thus to reliably retain the idle gear 19 engaging into the pickup drive gear 25. The second tension coil spring 37 is coupled to the other end of the second turning member 35 and biases the member 35 so as to turn this member 35 clockwise. When the idle gear 19 engages into and rotates the pickup drive gear 25 and moves the pickup 16a to its initial position, the pickup 16a pushes the other end 35b of the second turning member 35 so as to turn the second turning member 35 counterclockwise while overcoming the spring force of the spring 37 or tensioning this spring 37. Because of the counterclockwise turning motion of the second turning member 35, the second push projection 35a of the member 35 releases the second locking projection 20b of the link 20 which has been locked to the second stopper 34. The structure of second turning member 35 is shown in detail in FIG. 7b. In the player drive device of this embodiment, the initial position of the pickup 16a is closer to the center of the turntable 12 by a predetermined distance δ in comparison with the conventional pickup initial position as shown in FIG. 6.

The operational effect of the above player drive device will be given hereinbelow.

When the cartridge guide bracket has no disk therein, the positions of the elements of the drive device are shown in FIG. 4a. In this state, the solenoid 33 is turned off and generates no magnetic force, so that the first tension coil spring 32 pulls the first turning member 29. Hence, the first turning member 29 is retained in its idle position shown at the dash and dot in FIG. 4a. The pickup 16a pushes the other end 35b of the second turning member 35, so that the second turning member 35 is retained in its idle position while overcoming the spring force of the second tension coil spring 37. In this case, the link 20 is locked to no element of the device.

When a disk 1 is inserted into the cartridge guide bracket, a limit switch (not shown) senses the insertion of the disk 1 and outputs a sensing signal, thus to start the motor 17. At this time, the motor 17 is rotated counterclockwise in the drawing and rotates the drive gear 21 in the same direction. The power transmission gear 18 gearing into the drive gear 21 is thus rotated clockwise in the drawing. The clockwise rotational force of the power transmission gear 18 is transmitted to the link 20 through the wool disc 38 interposed therebetween, thus to rotate the link 20 clockwise. Therefore, the idle gear 19 coupled to the link 20 engages the loading gear 22 and, at the same time, the first locking projection 20a of the link 20 engages the first stopper 28.

The above engagement of the first locking projection 20a of the link 20 with the first stopper 28 is sensed by the locking sensor. After sensing the engagement, the locking sensor turns on the solenoid 33. This solenoid 33 thus generates the magnetic force which attracts the metal piece 30 of the first turning member 29. Hence, the first turning member 29 is turned clockwise about its hinged shaft 31 while overcoming the spring force of the first tension coil spring 32 as shown at the solid line of FIG. 4a. With the clockwise turning motion of the first turning member 29, the first push projection 29a of the turning member 29 pushes the first locking projection 20a to the first stopper 28, thus sandwiching the first locking projection 20a between the first push projection 29a and the first stopper 28 as shown in FIG. 4a.

When the first locking projection 20a of the link 20 is sandwiched between the first push projection 29a and the first stopper 28, the rotational force of the power transmission gear 18 is reliably transmitted to this loading gear 22 through the idle gear 19, thus to rotated the loading gear 22. The loading gear 22 thus rotates both the first driven gear 24 and the first lead screw 23, thereby seating the cartridge guide bracket coupled to the lead screw 23 on its loading place in the deck 6. The disk loading operation is thus finished.

After the disk loading operation, the solenoid 33 is turned off and does not generate the magnetic force any more, so that the first turning member 29 is pulled by the first tension coil spring 32 and turned counterclockwise about its shaft 31. The counterclockwise turning motion of the first turning member 29 frees the first locking protrusion 20a of the link 20 from the first push projection 29a of the member 29. Therefore, the link 20 is engaged with no element and applied with no outside force.

After the outside force biasing the link 20 is removed, the motor 17 is rotated clockwise in the drawing and rotates the drive gear 21 in the same direction. The power transmission gear 18 is thus rotated counterclockwise in the drawing. The counterclockwise rotational force of the power transmission gear 18 is transmitted to the link 20 through the wool disc 38, thus to rotate the link 20 counterclockwise. Therefore, the idle gear 19 coupled to the link 20 engages the pickup drive gear 25 and, at the same time, the second locking projection 20b of the link 20 is engaged with the second stopper 34.

When the link 20 is turned toward the pickup drive gear 25, there is no interference between the second turning member 35 and the second locking projection 20b since the second turning member 35 is pushed by the pickup 16a placed in its initial position. That is, since the second turning member 35 is retained in its counterclockwise biased state while overcoming the spring force of the second tension coil spring 3, no interference is generated between the second push projection 35a of the second turning member 35 and the second locking projection 20b of the link 20 during the counterclockwise turning motion of the link 20.

As a result of gearing the idle gear 19 of the link 20 into the pick drive gear 25, the second driven gear 27 is rotated. The pickup 16a coupled to the lead screw 26 thus starts its linear movement in leftward direction as shown at the arrow of FIG. 4a. The leftward directional movement of the pickup 16a removes the outside force applied from the pickup 16a to the other end 35b of the second turning member 35, thus to let the second turning member 35 be turned clockwise by the restoring force of the second tension coil spring 37 as shown in FIG. 4b. With the clockwise turning motion of the second turning member 35, the second push projection 35a of the second turning member 35 pushes the second locking projection 20b to the second stopper 34, thus to make this second locking projection 20b sandwiched between it and the second stopper 34 as shown in FIG. 4b.

When the second locking projection 20b of the link 20 is sandwiched between the second push projection 35a and the second stopper 34, the rotational force of the power transmission gear 18 is reliably transmitted to the pickup drive gear 25 through the idle gear 19, thus to rotated this pickup gear 25. The pickup drive gear 25 thus rotates both the second driven gear 27 and the second lead screw 26 and in turn reciprocates the pickup 16a, which is coupled to the lead screw 26, across the loaded disk 1.

The locking of the second locking projection 20b of the link 20 by sandwiching it between the second stopper 34 and the second push projection 35a of the second turning member 35 is for returning the pickup 16a to its initial position. Otherwise stated, in order to return the pickup 16a to its initial position, the drive motor 17 should be rotated counterclockwise. When the link 20 is not locked during the above counterclockwise rotation of the drive motor 17, the idle gear 19 will be separated from the pickup drive gear 25 and this makes the returning of the pickup 16a to its initial position impossible.

When the disk 1 needs ejecting from the disk player after picking up the information of the disk 1, the drive motor 17 is rotated counterclockwise in the drawing under the control of a microcomputer (not shown), thus to return the pickup 16a to its initial position as shown in FIGS. 4a and 6. At this time, the initial position of the pickup 16a is closer to the center of the turntable 12 by the predetermined distance δ in comparison with the conventional pickup initial position as shown in FIG. 6. As a result of returning of the pickup 16a to its initial position, the other end 35b of the second turning member 35 is pushed leftward in the drawing by the pickup 16a while overcoming the spring force of the second tension coil spring 37. The biasing force applied from the second push projection 35a of the second member 35 to the second locking projection 20b of the link 20 is removed.

When unloading or ejecting the disk 1, the motor 17 is rotated counterclockwise in the drawing and rotates the drive gear 21 in the same direction. The power transmission gear 18 gearing into the drive gear 21 is thus rotated clockwise in the drawing. The clockwise rotational force of the power transmission gear 18 is transmitted to the link 20 through the wool disc 38 interposed therebetween, thus rotating the link 20 clockwise. Therefore, the idle gear 19 coupled to the link 20 engages the loading gear 22 and, at the same time, the first locking projection 20a of the link 20 is engaged with the first stopper 28.

The above engagement of the first locking projection 20a of the link 20 with the first stopper 28 is sensed by the locking sensor and turns on the solenoid 33. This solenoid 33 thus generates the magnetic force which attracts the metal piece 30 of the first turning member 29. Hence, the first turning member 29 is turned clockwise about its hinged shaft 31 while overcoming the spring force of the first tension coil spring 32. With the clockwise turning motion of the first turning member 29, the first push projection 29a of the second turning member 29 pushes the first locking projection 20a to the first stopper 28, thus sandwiching the first locking projection 20a between the first push projection 29a and the first stopper 28 as shown in FIG. 4a.

When the first locking projection 20a of the link 20 is sandwiched between the first push projection 29a and the first stopper 28, the drive motor 17 is rotated in a direction reverse to that of the above disk loading operation. The disk unloading operation is thus finished.

As described above, a device for driving a minidisk player in accordance with the present invention uses one drive motor commonly used for both the disk loading/unloading operation and the pickup driving operation, thus to reduce the cost. The player drive device does not need a gear train unlike the typical device, so that it does not need a large capacity and large-sized motor as the loading motor. With the simple structure of the player drive device having no gear train, the device occupies a small space, thus saving the space. This makes the minidisk player small-sized and achieves the recent trend of compactness of the disk player, particularly of the portable minidisk player.

Also, with the described device, the initial position of the pickup may be closer to the center of the turntable, by a predetermined position, than a convention pickup initial position.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for driving a minidisk player, comprising:

a deck;

a drive motor mounted on said deck;

a power transmission gear coupled to said drive motor and rotated by said drive motor;

a friction gear in surface contact with said power transmission gear;

a link in surface contact with said friction gear, said link being turned one of clockwise and counterclockwise directions by said friction gear depending on the rotational direction of said power transmission gear;

an idle gear rotatably mounted on said link and rotated by a rotational force of said power transmission gear;

a disk loading gear placed in turning range of said link, said loading gear engaging said idle gear during a disk loading/unloading operation;

a pickup drive gear placed in the turning range of said link, said pickup drive gear engaging said idle gear during a pickup driving operation to drive a pickup;

a solenoid mounted on said deck for generating a magnetic force;

a first locking projection provided on one side of said link and turned in opposed directions depending on opposed directional turning motion of said link;

a first stopper mounted on said deck and selectively engaged with said first locking projection when said idle gear engages said disk loading gear for carrying out the disk loading/unloading operation;

a first turning member rotatably mounted on said deck and turned about a hinged shaft by the magnetic force of said solenoid so as to be closer to said first stopper when said first locking projection is engaged with said first stopper;

a second locking projection provided on the other side of said link and turned in opposed directions depending on opposed directional turning motion of said link;

a second stopper mounted on said deck and selectively engaged with said second locking projection when said idle gear engages said pickup drive gear for carrying out said pickup driving operation; and a second turning member rotatably mounted on said deck and turned about a hinged shaft so as to be closer to said second stopper when the second locking projection is engaged with the second stopper.

2. The device according to claim 1, wherein said friction gear is a wool disc tightly interposed between said power transmission gear and said link.

3. The device according to claim 1, further comprising:

a first push projection provided on an end of said first turning member, said first push projection sandwiching said first locking projection between said first push projection and said first stopper when said first locking projection is engaged with said first stopper.

4. The device according to claim 1, wherein said first turning member is biased, at its end having the first push projection, by a spring means to prevent a possible interference between said first turning member and said first locking projection during the turning motion of said link for engaging said first locking projection of said link with said first stopper.

5. The device according to claim 3, further comprising:

a second push projection provided on an end of said second turning member, said second push projection sandwiching said second locking projection between said second push projection and said second stopper when said second locking projection is engaged with said second stopper; and spring means coupled to the other end of said second turning member for biasing said turning member, said spring means elastically turning said second turning member so as to make said second push projection closer to said second stopper.

6. The device according to claim 5, wherein the pickup, moving to an initial position by rotational force of said pickup drive gear, pushes the other end of said second turning member to turn said second turning member while overcoming a spring force of the spring means and to let said second push projection release the second locking projection of said link.

7. The device according to claim 6, wherein said initial position of the pickup is close to the center of a turntable.

8. A device for driving a minidisk player, comprising:

a deck;

a drive motor mounted on the deck;

a power transmission gear coupled to the drive motor and rotated by the drive motor;

a friction gear in surface contact with the power transmission gear;

a link in surface contact with the friction gear, the link being turned one of clockwise and counterclockwise directions by the friction gear depending on the rotational direction of the power transmission gear;

an idle gear rotatably mounted on the link and rotated by a rotational force of the power transmission gear;

a disk loading gear placed in turning range of the link, the loading gear engaging the idle gear during a disk loading/unloading operation;

a pickup drive gear placed in the turning range of the link, the pickup drive gear engaging the idle gear during a pickup driving operation to drive a pickup; and first and second locking units for locking the idle gear in one of two predetermined positions so as to let the idle gear be rotated in opposed directions while engaging either the disk loading gear or the pickup drive gear;

wherein the first locking unit comprises:

a solenoid mounted on the deck for generating a magnetic force;

a first locking projection provided on one side of the link and turned in opposed directions depending on opposed directional turning motion of the link;

a first stopper mounted on the deck and selectively engaged with the first locking projection when the idle gear engages the disk loading gear for carrying out a disk loading/unloading operation;

a first turning member rotatably mounted on the deck and turned about a hinged shaft by the magnetic force of the solenoid so as to be closer to the first stoppage when the first locking projection is engaged with the first stopper; and a first push projection provided on an end of the first turning member, the first push projection sandwiching the first locking projection between the first push projection and the first stopper when the first locking projection is engaged with the first stopper.

9. The device according to claim 8, wherein the second locking unit comprises:

a second locking projection provided on the other side of the link and turned in opposed directions depending on opposed directional turning motion of the link;

a second stopper mounted on the deck and selectively engaged with the second locking projection when the idle gear engages the pickup drive gear for carrying out the pickup driving operation;

a second turning member rotatably mounted on the deck and turned about a hinged shaft so as to be closer to the second stopper when the second locking projection is engaged with the second stopper;

a second push projection provided on an end of the second turning member, the second push projection sandwiching the second locking projection between the second push and projection the second stopper when the second locking projection is engaged with the second stopper; and spring means coupled to the other end of the second turning member for biasing the turning member, the spring means elastically turning the second turning member so as to make the second push projection closer to the second stopper.

10. A device for driving a minidisk player, comprising:

a deck;

a drive motor mounted on the deck;

a power transmission gear coupled to the drive motor and rotated by the drive motor;

a friction gear in surface contact with the power transmission gear;

a link in surface contact with the friction gear, the link being turned one of clockwise and counterclockwise directions by the friction gear depending on the rotational direction of the power transmission gear;

an idle gear rotatably mounted on the link and rotated by a rotational force of the power transmission gear;

a disk loading gear placed in turning range of the link, the loading gear engaging the idle gear during a disk loading/unloading operation;

a pickup drive gear placed in the turning range of the link, the pickup drive gear engaging the idle gear during a pickup driving operation to drive a pickup; and first and second locking units for locking the idle gear in one of two predetermined positions so as to let the idle gear be rotated in opposed directions while engaging either the disk loading gear or the pickup drive gear;

wherein the second locking unit comprises:

a locking projection provided on one side of the link and turned in opposed directions depending on opposed directional turning motion of the link;

a stopper mounted on the deck and selectively engaged with the locking projection when the idle gear engages the pickup drive gear for carrying out the pickup driving operation;

a turning member rotatably mounted on the deck and turned about a hinged shaft so as to be closer to the stopper when the locking projection is engaged with the stopper;

a push projection provided on an end of the turning member, the push projection sandwiching the locking projection between the push projection and the stopper when the locking projection is engaged with the stopper; and spring means coupled to the other end of the turning member for biasing the turning member, the spring means elastically turning the turning member so as to make the push projection closer to the stopper.

* * * * *